United States Patent

Furukawa et al.

[11] Patent Number: 5,909,537
[45] Date of Patent: Jun. 1, 1999

[54] CONTROL METHOD FOR MICROFILM IMAGE READER

[75] Inventors: Takao Furukawa, Tokyo; Michinori Hashimoto, Kanagawa, both of Japan

[73] Assignee: Fuji Photo Film Co., Ltd., Kanagawa, Japan

[21] Appl. No.: 08/672,113

[22] Filed: Jun. 27, 1996

[30] Foreign Application Priority Data

Jun. 28, 1995 [JP] Japan ................................ 7-183302

[51] Int. Cl.$^6$ .......................... H04N 1/407; G06K 15/12
[52] U.S. Cl. .......................... 395/109; 358/455; 358/302; 358/462; 347/253
[58] Field of Search .................................. 382/176, 173, 382/270; 358/462, 465, 466, 456, 457, 458, 298, 455; 395/109; 347/253, 252, 251

[56] References Cited

U.S. PATENT DOCUMENTS

| | | | |
|---|---|---|---|
| 4,707,745 | 11/1987 | Sakano | 358/456 |
| 4,933,979 | 6/1990 | Suzuki et al. | 382/173 |
| 5,016,117 | 5/1991 | Matsumoto et al. | 358/456 |
| 5,396,276 | 3/1995 | Senda et al. | 358/302 |
| 5,485,289 | 1/1996 | Curry | 358/462 |
| 5,659,402 | 8/1997 | Fujita et al. | 358/462 |
| 5,710,828 | 1/1998 | Hashimoto | 382/172 |

FOREIGN PATENT DOCUMENTS

| | | | |
|---|---|---|---|
| A20658039 | 6/1995 | European Pat. Off. | H04N 1/40 |
| A20663758 | 7/1995 | European Pat. Off. | H04N 1/40 |
| 62-257279 | 11/1987 | Japan | H04N 1/40 |

*Primary Examiner*—Scott Rogers
*Attorney, Agent, or Firm*—Sughrue, Mion, Zinn, Macpeak & Seas, PLLC

[57] ABSTRACT

There is provided a control method of a microfilm image reader, in which a scanner reads an image in a frame recorded on a microfilm and supplies image data of the read image to a printer, for printing out image data of an original image faithfully in a relatively easy processing even if the original image largely contains middle tone portions, without either calculating a threshold value for binarization by a complicated method or performing a special image processing to be uniquely performed to a binary density image. The scanner reads the image in a multi-tone gradation and the printer prints out image data of at least one portion of the read image in the multi-tone gradation. When the image in a frame contains both a multi-tone gradation portion in a photograph area and a binary density portion in a document area, image data of the photograph area and image data of the document area are printed out in the multi-tone gradation and the binary density or gradation, respectively. If the frames are photographed on the microfilm in a predetermined form or forms, coordinates of the photograph area are previously memorized in each form so that the photograph area can be printed out in the multi-tone gradation automatically.

4 Claims, 7 Drawing Sheets

CONTROL METHOD FOR MICROFILM IMAGE READER

BACKGROUND OF THE INVENTION

1. Field of the Invention

The present invention relates to a control method for a microfilm image reader, in which a scanner reads an image of a frame recorded on a microfilm and supplies image data of the read image to a printer.

2. Prior Art

A typical microfilm image reader includes a host computer, a scanner and a printer, in which the scanner retrieves a target frame from a microfilm based on a command sent from the host computer to the scanner, reads an image in the target frame and transfers image data of the read image to the host computer. The host computer then processes the image data in a predetermined image processing and the processed image data is either supplied to the printer or transferred to another computer.

The microfilm used herein generally contains black and white images which are read as binary density images by the scanner and supplied to the printer.

However, other images, which largely contain middle or half tone image (gray scale image) portions such as photographs, signs and stamps, are often recorded on the microfilm in addition to the black and white document images. When printing out such images containing middle tone image portions by a conventional printer, density data of the images must be binarized by a proper threshold value, followed by image processings for representing the middle tones, but it has been difficult to set such a threshold value.

Although a method may be used to set the threshold value for binarization processing, in which a density or gray level histogram of an image is plotted to determine the threshold value, the determination process has been complicated. Even if a proper threshold value is determined, false contouring lines like as a moire pattern often appear especially in middle-tone portions of the image when printed out. To prevent the occurrence of the false contouring, a processing such as a dither processing needs performing.

However, since a dither matrix needed for the dither processing must be changed depending on characteristics of the image to be processed, the processing has been too complicated. Further, when such a particular image processing is performed, delicate shades of the original image may not be represented, and it has been difficult to print out image data of the original image accurately.

SUMMARY OF THE INVENTION

The present invention has been accomplished under the circumstances as aforementioned, and an object thereof is to provide a control method for a microfilm image reader, in which image data of an original image can be printed out with high fidelity with relatively easy processing, even if the original image largely contains middle tone portions, without either selecting a threshold value for binarization by a complicated method or performing a special image processing to be uniquely performed to a binary density image.

The object of the present invention is attained by the provision of a control method for a microfilm image reader, in which a scanner reads an image of a frame recorded on a microfilm and supplies image data of the read image to a printer, comprising the steps of:

reading the image in a multi-tone gradation or gray level by the scanner; and printing out image data of at least one portion of the read image in the multi-tone gradation (gray level) by the printer.

The image of the target frame recorded on the microfilm may be either only a photographic image or an image containing both photograph and document areas. When the image contains both a multi-tone gradation portion in the photograph area and a binary density portion in the document area, the microfilm image reader system to which the present invention is applied can print out image data of the photograph area in the multi-tone gradation and image data of the document area at the binary density. If many documents are photographed on a microfilm in an identical document form or any one of the predetermined number of forms, the printer can be printed out only the image data of the photograph area in the multi-tone gradation by previously memorizing coordinates of the photograph area in each form.

For example, blip marks may be used to discriminate document forms recorded on the respective frames, so that the corresponding form of the photograph area can be read out from the memory. Otherwise, the form of the photograph area may be set in each frame through a keyboard or the like.

The image data of the photograph area to be printed out in the multi-tone gradation (gray scale) remarkably varies in background density level depending on photographing conditions of the microfilm (especially exposure conditions) or the type of an original document (such as an old document or a map). It is therefore desirable to adjust the background density level of the photograph area to a predetermined printing density. It is also desirable to edge-emphasize or highlight the binary density portion in the document area so that the document can be read clearly.

BRIEF DESCRIPTION OF THE DRAWINGS

The above and other objects and advantages and further description will now be discussed in connection with the drawings, in which.

DETAILED DESCRIPTION OF THE PREFERRED EMBODIMENTS

Figure 1:
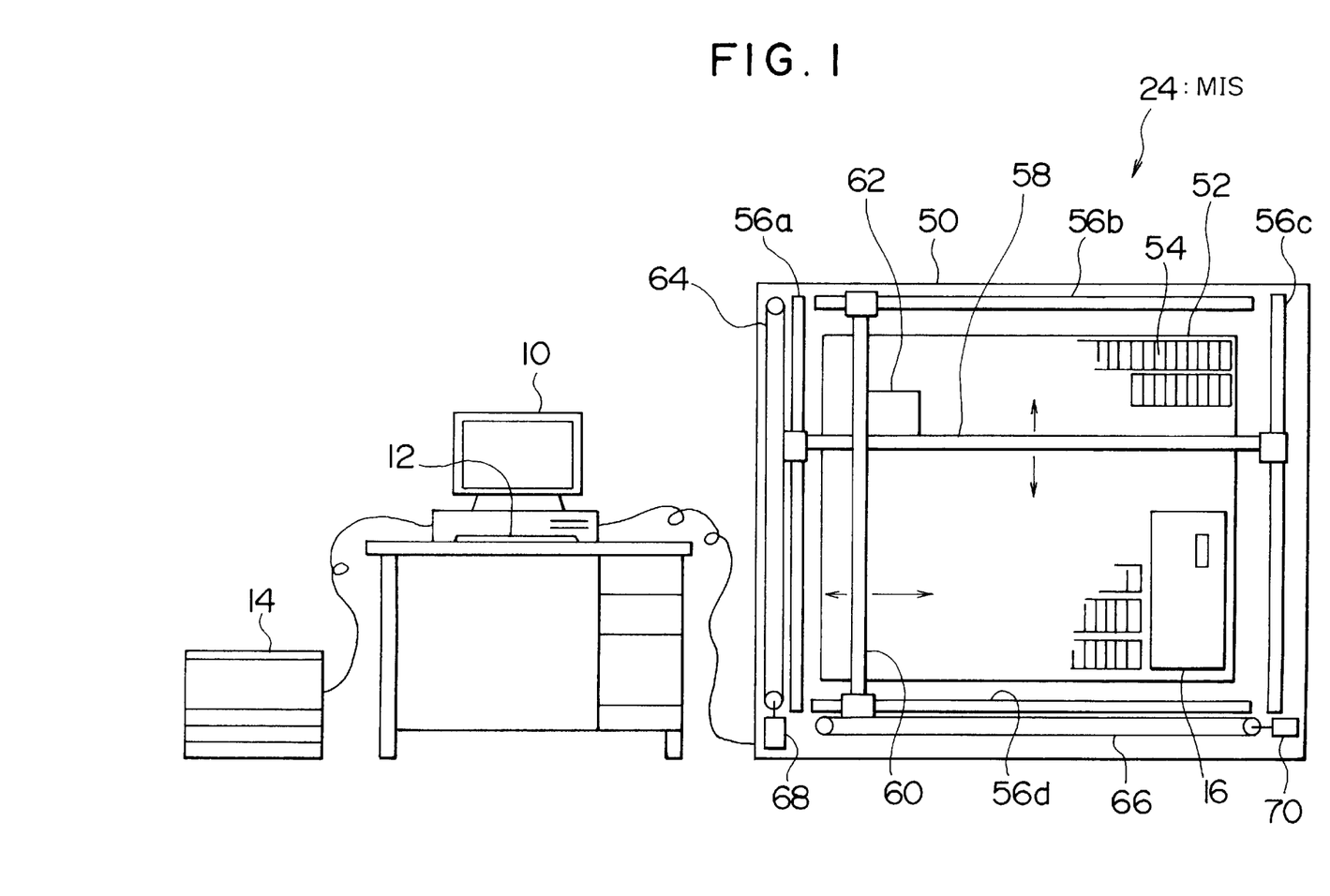
FIG. 1 is a schematic diagram showing a microfilm image reader system to which an embodiment of the present invention is applied.
Figure 2:
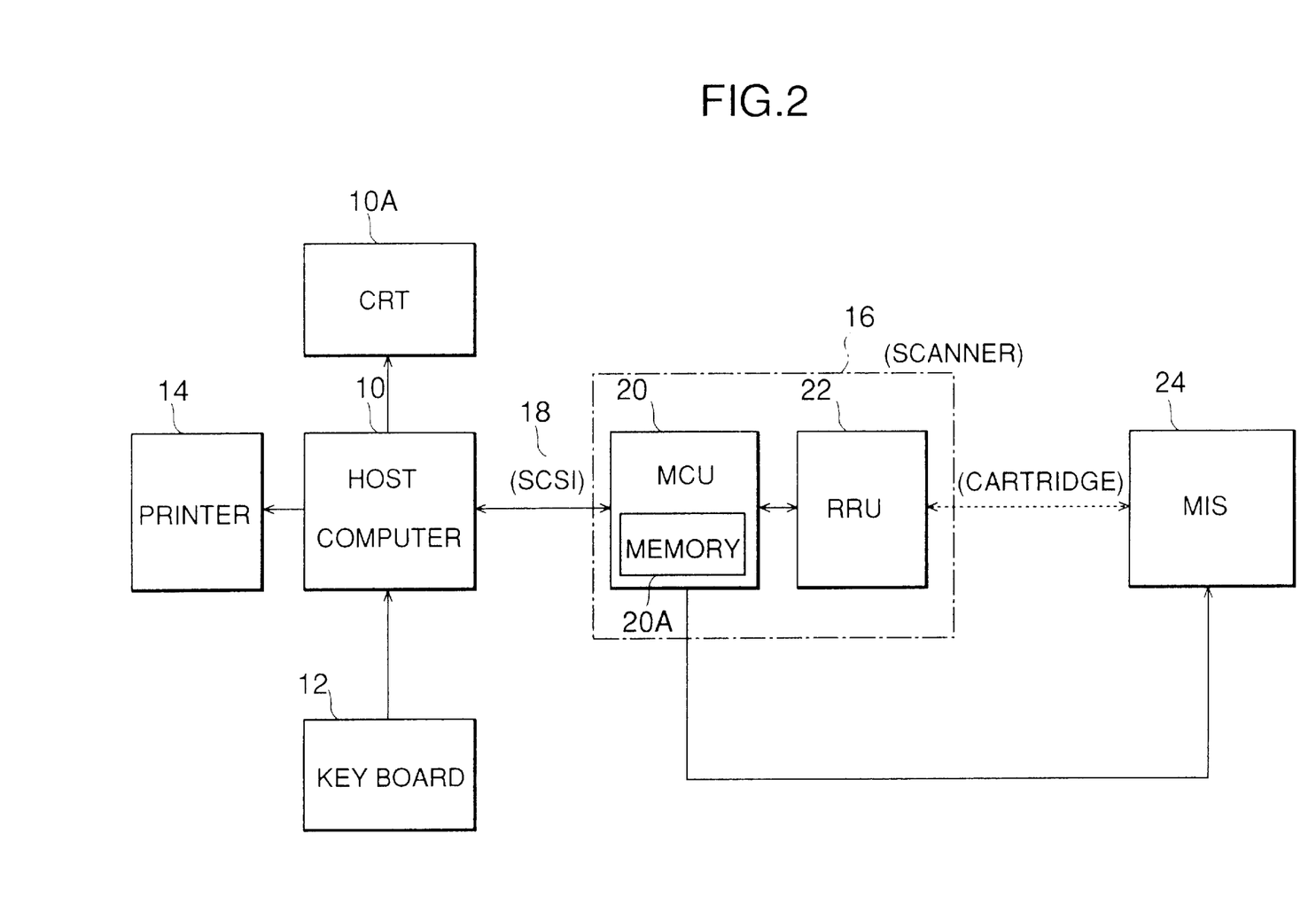
FIG. 2 is a block diagram showing a general structure of the system in FIG. 1.

Referring to FIGS. 1 and 2, a reference numeral 10 denotes a host computer with a display 10A such as a CRT, which is constituted with a personal computer or a work station. A key board 12 and a printer 14 are connected to the host computer 10. A reference numeral 16 is a scanner for retrieving a target frame recorded on a microfilm and reading (scanning) an image in the target frame. The scanner 16 is placed inside a MIS (Microfilm Install Unit) 24 described later.

The scanner 16 is then connected to the host computer 10 through a bus (BUS) 18 in accordance with a SCSI standard. That is, the connection between the host computer 10 and scanner 16 is established by an SCSI interface. The scanner 16 includes a microfilm control unit (hereinafter, also referred to as MCU in this specification and appended drawings) 20 and a roll-film retrieval unit (hereinafter, also referred to as RRU) 22.

The MCU 20 is provided with a microcomputer for controlling the retrieval operation of the RRU 22 as well as for reading an image in a retrieved frame while moving a line sensor and storing image data of the read image in a memory 20A such as DRAM. The RRU 22 retrieves a desired frame while feeding a roll of microfilm.

The microfilm install unit (MIS) 24 stores a large number of microfilm cartridges and selects a desired cartridge to load the RRU 22 of the scanner 16. When the MCU 20 has specified a cartridge containing a target frame to be retrieved, if the cartridge is not loaded into the RRU 22, the MIS 24 will operate to replace a cartridge currently loaded in the RRU 22 by the cartridge containing the target frame.

As shown in FIG. 1, the MIS 24 has a rectangle case 50 and cartridge shelves 52 are provided inside the case 50 for storing a large number of microfilm cartridges 54 so that a desired cartridge can be slid in or out from the front of the corresponding shelf 52. On the front face of the case 50, guide rails 56 (56a, 56b, 56c, 56d) are fixed along the four sides, where a horizontal rail 58 is guided along the opposite two guide rails 56a, 56c to move up and down, whereas a vertical rail 60 is guided along the opposite two guide rails 56b, 56d to move sideways.

The horizontal rail 58 and the vertical rail 60 move in vertical and lateral directions, respectively, with maintaining right angles to each other, and a cartridge carrier 62 is slidably attached to the rails 58, 60 at the intersection of the two rails 58, 60. The horizontal rail 58 is fixed to a belt 64 tightly wound around a pair of pulleys located near the both ends of the guide rail 56a, whereas the vertical rail 60 is fixed to a belt 66 tightly wound around a pair of pulleys located near the both ends of the guide rail 56d. The belts 64, 66 are moved and positioned by motors 68, 70, respectively, each motor 68, 70 coupled to a corresponding pulley.

Thus, the horizontal rail 58 and the vertical rail 60 are moved individually by the motor 68 and 70, so that the cartridge carrier 62 can be shifted to a proper position. The cartridge shelves 52 and the scanner 16 are located within a movable range of the cartridge carrier 62. For example, the scanner 16 is placed in the right corner of the lower portion within the movable range of the cartridge carrier 62.

The cartridge carrier 62 picks up a desired cartridge 54 from a cartridge shelf 52 and carries it to the scanner 16, After the retrieval and reading operation, the cartridge carrier 62 receives a currently loaded cartridge from the scanner 16 at the end of the retrieval and returns it to a predetermined position on the corresponding cartridge shelf 52.

Figure 3:
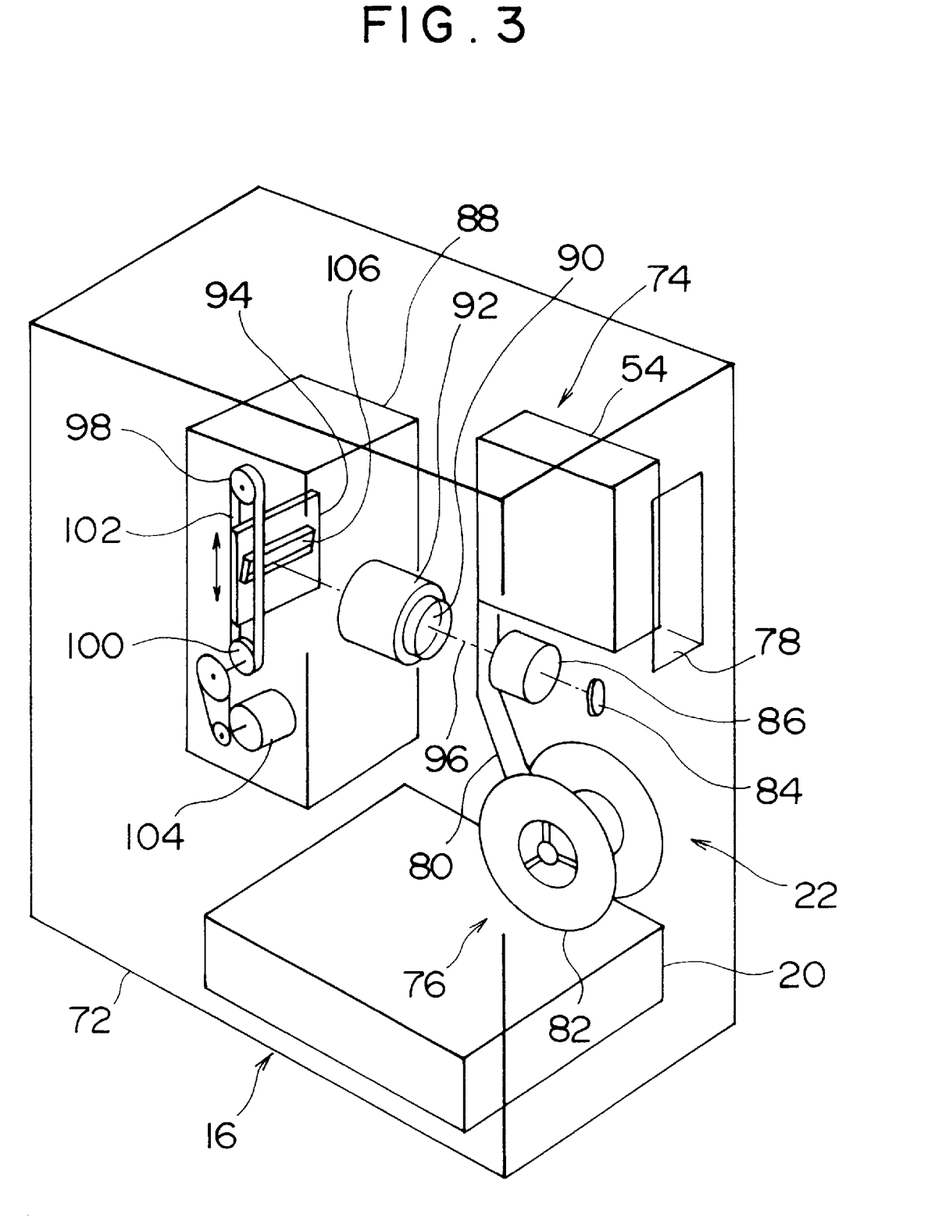
FIG. 3 is a perspective view illustrating an inner arrangement of a scanner used in the system in FIG. 1.

Referring next to FIG. 3, an inner arrangement of the scanner 16 will be described. The scanner 16 includes the MCU 20 and the RRU 22 as mentioned above. The scanner 16 has a longitudinal cabinet 72, and the MCU 20 and the RRU 22 are provided inside the cabinet 72. The MCU 20 is constituted with a microcomputer and mounted on the bottom of the cabinet 72. Hereinbelow, a description will be made to the RRU (roll-film retrieval unit) 22.

In the cabinet 72, a feed reel driving unit 74 and a take-up reel driving unit 76 are arranged in the upper front portion and lower front portion, respectively. When a cartridge 54 is inserted into a cartridge loading port 78, the feed reel driving unit 74 automatically moves the cartridge 54 and engages a feed reel with a rotating shaft of the feed reel driving unit. Then, the feed reel driving unit 74 pulls out a head lead of a roll film 80 loaded in the cartridge 54 and feeds it downwardly to guide it to a take-up reel 82 in the take-up reel driving unit 76.

When viewing the scanner 16 in FIG. 3, the film 80 passes through the back side of the empty space between the respective reel driving units 74, 76, that is, the film 80 passes through at the inner backside as viewed from the front of the cabinet 72, so that light source lamp 84 and condenser lens 86 can be arranged in a space formed by a gap between the reel-to-reel distance and the front panel of the cabinet 72.

In the cabinet 72, a line sensor unit 88 is also provided for reading a projected image in a target frame by a line sensor. The line sensor unit 88 is integrated with a projection lens 90. More specifically, a cylindrical section 92 for holding the projection lens 90 is integrally formed with the case of the line sensor unit 88. The projection lens 90 mounted in the cylindrical section 92 is a fixed focus lens with a magnifying power of approximately 2.

In the case of the line sensor unit 88, a movable plate 94 is provided on the side opposite to the cylindrical section 92. The movable plate 94 is slidably mounted along with a pair of guide rods (not shown) fixed to the case, so that the movable plate 94 can reciprocate along a plane perpendicular to an optical axis 96 and around the opening of the cylindrical section 92.

Further, a belt 102 wound around pulleys 98, 100 is provided inside the case in a position parallel to the reciprocating direction of the movable plate 94, and one side of the movable plate 94 is fixed to the belt 102. The belt 102 is driven by a stepping motor 104 through the pulley 100. Thus, the movable plate 94 can be reciprocated on a plane perpendicular to the optical axis 96 by rotating the stepping motor 104 in a forward or reverse direction.

A CCD arrayed line sensor 106 is fixed on the movable plate 94 in a direction perpendicular to the reciprocating direction of the movable plate 94. It should be noted that the light-receiving surface of the CCD line sensor 106 must correspond to a plane on which a projected image from the projection lens 90 is focused.

The RRU (roll-film retrieval unit) 22 is also provided with a blip mark detection means (not shown) for detecting blip marks previously marked on each frame of the film 80 as key points of the retrieval. The blip marks are counted by a light-emitting element and a light-receiving element arranged through the film 80 running through therebetween. The MCU (microfilm control unit) 20 thus controls the RRU 22 to search or retrieve a target frame in accordance with a counted blip mark corresponding to the target frame.

Figure 4:
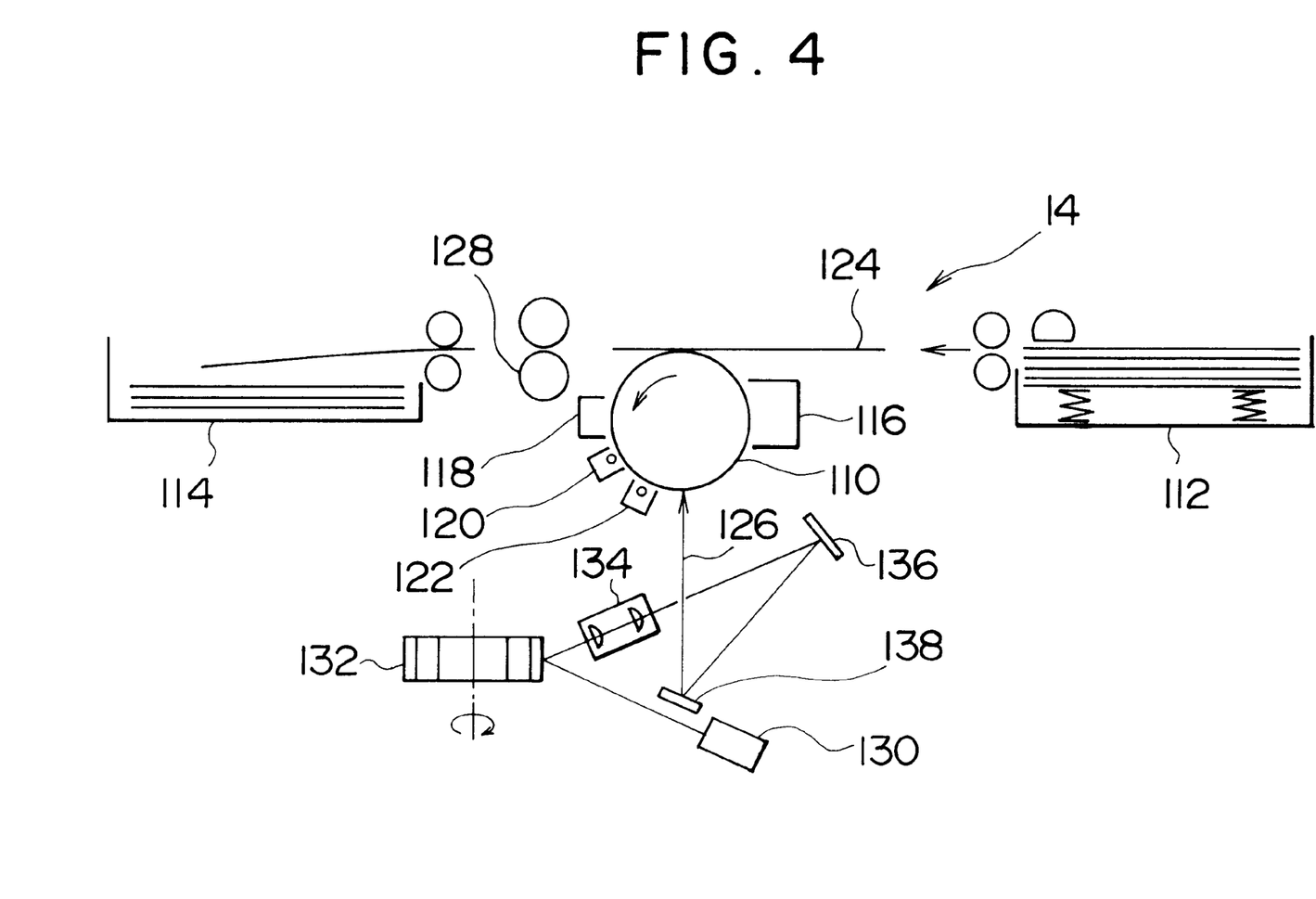
FIG. 4 is a descriptive diagram showing a working principle of a printer used in the system in FIG. 1.

Referring next to FIG. 4, structure and working principle of the printer 14 will be described. In FIG. 4, there are shown a photosensitive drum 110, a paper feed tray 112 and a paper stacker 114. Around the photosensitive drum 110, a toner supplying unit 116, a toner removing unit 118, a static eliminator 120 and a static charger 122 are provided in this order in a revolving direction around the photosensitive drum 110.

In operation, a print paper 124 is pulled out one by one from the paper feed tray 112 and brought into contact with the surface of the photosensitive drum 110 in a distance between the toner supplying unit 116 and the toner removing unit 118.

The static charger 122 uniformly charges the surface of the photosensitive drum 110 to a fixed polarity, and an area of the drum surface 110 is exposed to a laser beam 126 so that a latent image is formed in the area. Then, toner supplied from the toner supplying unit 116 adheres to the latent image area, and the toner applied area of the latent image is transferred to the print paper 124 and thermally fused by heat rollers 128. The latent image is formed by projecting the laser beam 126 on the drum surface 110 so that the charged area of the drum surface 110 that was charged during passing through the static charger 122 can be discharged.

Since the toner supplied from the toner supplying unit 116 to the drum surface 110 is polarized to be opposite to the drum surface 110 that was charged by the static charger 116, the toner adheres to only the latent image area. Further, the print paper 124 is previously polarized to be opposite to the toner, so that the toner can be transferred smoothly from the drum surface 110 to the print paper 124.

The laser beam 126 is emitted from a light source or a semiconductor laser 130 and reflected by a polygonal mirror (rotating polygonal mirror) 132 which turning round its own axis at a high speed. The laser beam 126 is then transmitted to the drum surface 110 through an f-θ lens 134 and reflection lenses 136, 138. The semiconductor laser 130 is activated by a linear driver 140 shown in FIG. 5, so that the laser beam 126 can be changed in strength, brightness and beam diameter by changing a driver current or driver voltage, thereby changing the printing density continuously or in multi-levels.

Figure 5:
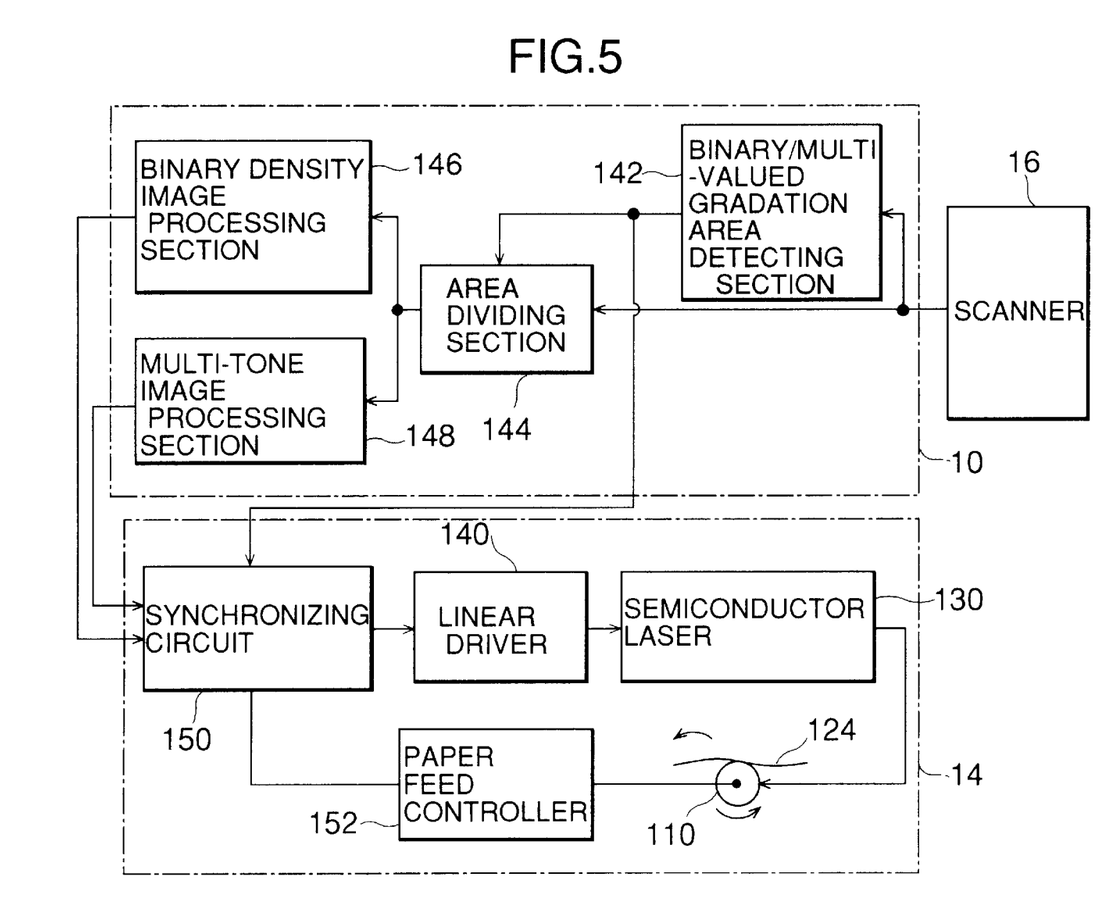
FIG. 5 is a functional block diagram of the system in FIG. 1.

As shown in FIG. 5, the host computer 10 includes a binary/multi-valued gradation area detecting section 142, which discriminates between image data of a binary density or gradation area (hereinbelow, referred as a binary area) and image data of a multi-valued or multi-tone gradation area (hereinbelow, referred as a multi-valued or multi-tone area), the respective image data read by the scanner 16 in preliminary scanning. An area dividing section 144 divides the image data of the image read in the preliminary scanning into image data of the binary area and image data of the multi-valued or multi-tone area.

Then, a binary density image processing section 146 binarizes an image portion in the binary area using a predetermined threshold value. The binarized portion of the image data is then subjected to an image processing particular to the binary density image, for example, a spatial filtering processing using an unsharped mask is conducted on the binarized image area. Meanwhile, a multi-tone image processing section 148 multinarizes an image portion in the multi-tone area and processes the multinarized image data in an image processing particular to the multi-tone or half-tone image, such as a gray scale transformation, for adjusting the background density of the image data to a constant density or a processing for changing a gray-level distribution.

The printer 14 includes a synchronizing circuit 150, in which respective image data of the binary density image and the multi-tone image are transmitted to the linear driver 140 synchronously with paper feed timing of a paper feed controller 152 and printed out in corresponding positions in binary and multi-tone gradations, respectively.

Figure 6:
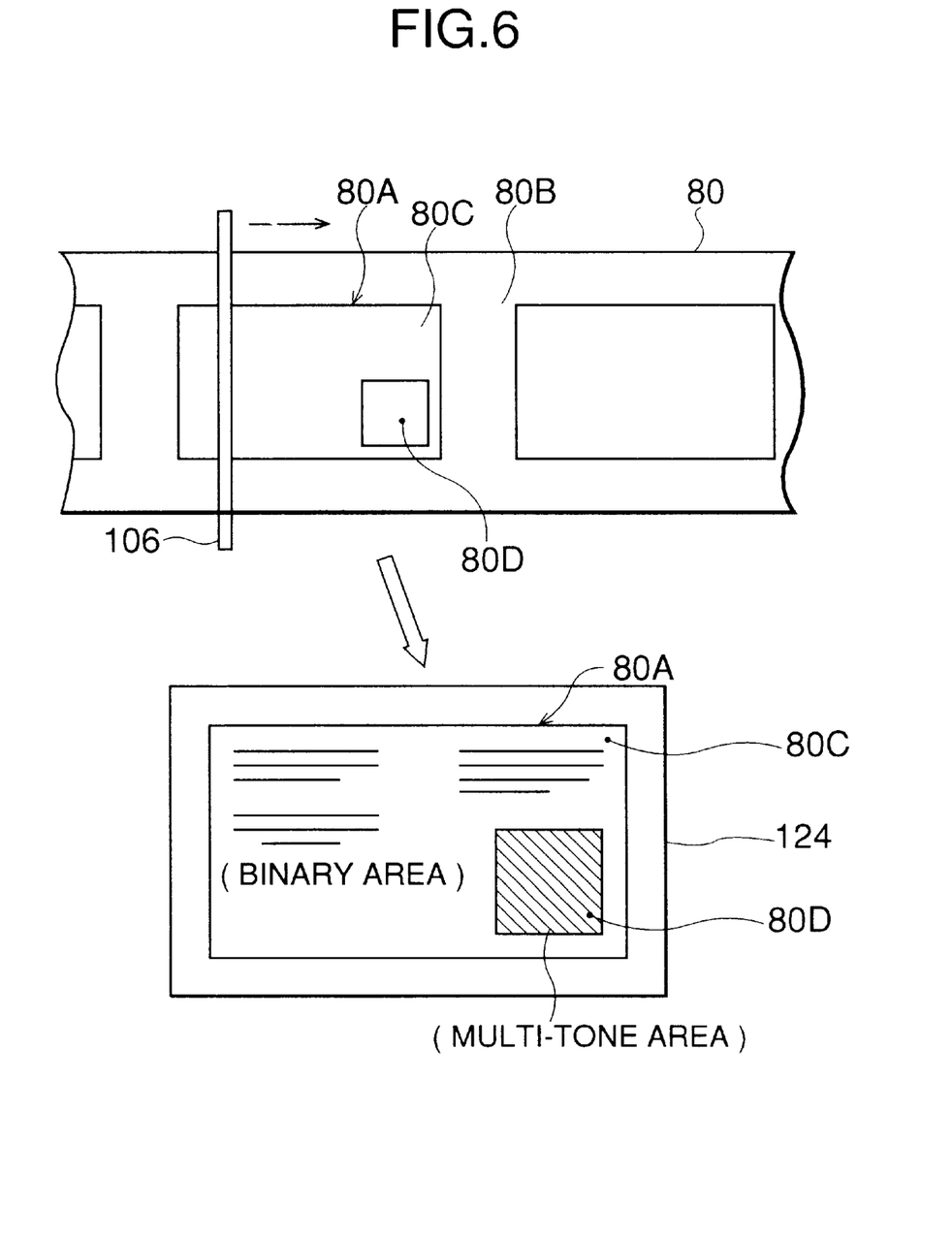
FIG. 6 is a simplified diagram showing operation of the embodiment.
Figure 7:
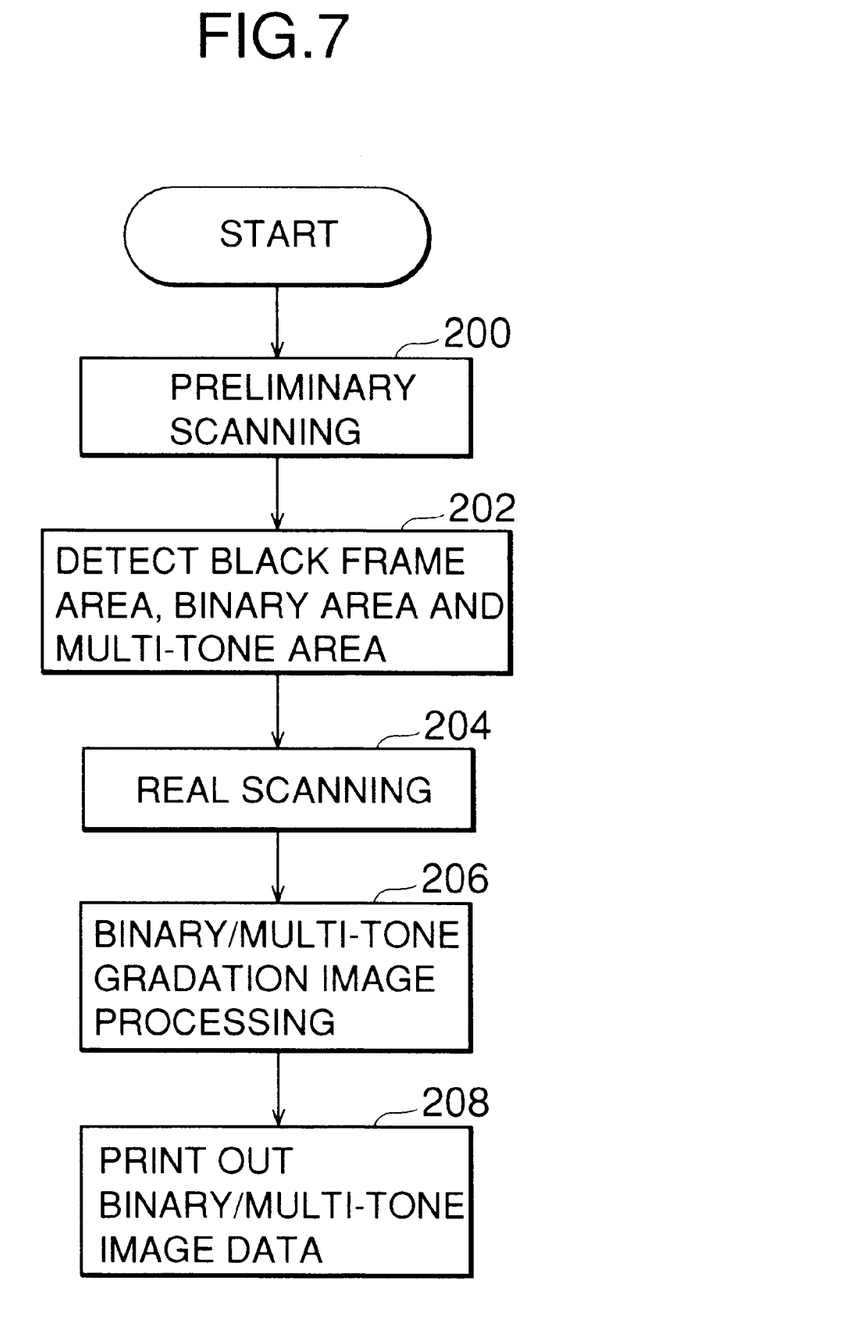
FIG. 7 is a flowchart explaining operation procedure of the embodiment.

Referring next to FIGS. 6 and 7, general operation of the embodiment will be described. After a target frame 80A (FIG. 6) was retrieved by the scanner 16, preliminary scanning of a projected image of the target frame 80A is performed by a line sensor 106 (step 200 in FIG. 7). The number of pixels to be read at the preliminary scanning stage is less than that at a real scanning stage, so that the image in the target frame 80A is read by the line sensor 106 at a high speed. After the preliminary scanning, the binary/multi-valued gradation area detecting section 142 of the host computer 10 discriminates not only between areas of the frame 80A and a black frame 80B, but also between a binary density image area 80C and a multi-tone image area 80D (step 202).

These areas are discriminated by a change in density between pixels. For example, the black frame 80B and the target frame 80A can be discriminated on a boundary line when a fixed or more numbers of pixels are continuously changed from white to black or black to white beyond the boundary line. On the other hand, the binary density image area 80C and the multi-tone image area 80D can be discriminated by a difference in background density between the areas.

After the respective areas 80A, 80B, 80C and 80D were discriminated, real scanning is performed (step 204), that is, the line sensor 106 is driven again to read an image in the target frame 80A at a high density. The area dividing section 144 of the host computer 10 then divides image data into the binary area 80C and the multi-tone area 80D in the corresponding reading area. The image data to be divided herein are sent sequentially from the line sensor 106 during reading of the image. The divided image data of the areas 80C and 80D are transmitted to the binary density image processing section 146 and the multi-tone image processing section 148, respectively. The image processing sections 146 and 148 process the respective image data and transfer the processed image data to the printer 14 (step 206).

In the printer 14, the synchronizing circuit 150 synchronizes the image data sent from the respective image processing sections 146 and 148 with paper feed timing of the print paper 124. The print paper 124 is fed under control of the paper feed controller 152, while the semiconductor laser 130 is energized under control of the linear driver 140. Thus, the binary density image area 80C and the multi-tone image area 80D can be printed out at the same time in binary and multi-tone gradations, respectively, as shown in FIG. 6 (step 208).

In the above operational embodiment, although the binary density image area 80C and the multi-tone image area 80D were detected automatically in the preliminary scanning, the present invention is not limited thereto, and these areas may be set in each frame manually with the keyboard 12. If the frames are photographed on a microfilm in a predetermined form or forms, these areas may be memorized in advance. The present invention can be also applied to a case where a multi-tone image is recorded on the full range of a frame without containing any image portion in the binary density area. It should be also noted that the image processings to be performed to respective image data of the binary density image area and the multi-tone image area are not limited to those cited in the above embodiment.

As described above, according to the present invention, an image in a target frame recorded on a microfilm is read by the scanner in a multi-tone gradation, and at least one portion of the read image is printed out by the printer in the multi-tone gradation. Accordingly, there is no need to calculate a threshold value for binarization through a complicated procedure and to process image data of a binary density image by an image processing specific to the binary density image, thereby printing out image data of an original image faithfully without any lack of image information of the original image.

When the image in the target frame contains both a binary density image such as a document and a multi-tone image such as a photograph, respective image data of the document area and the photograph area can be printed out as a binary density image and a multi-tone or half-tone image, respectively. The range of photograph area may be either preset in a memory and discriminated automatically, or set in each frame manually.

Further, a gray scale transformation can be performed to a multi-tone image for adjusting the background density in the multi-tone or half-tone image area to a predetermined density. It is therefore possible to obtain a clear printout even when the original document to be printed out is an old document or a map which may remarkably vary in background density compared with a normal document. Furthermore, the binary density image can be processed in a proper image processing such as an edge-emphasizing processing and printed out clearly.

What is claimed is:

1. A control method for a microfilm image reader, in which a scanner reads an image of a frame recorded on a microfilm and supplies image data of the read image to a printer, comprising the steps of:

reading the image in a multi-tone gradation by said scanner; and printing out image data of at least one portion of the read image in the multi-tone gradation by said printer;

wherein the image of the frame recorded on the microfilm contains both a halftone portion in a photograph area and a binary density portion in a document area, and said printer prints out image data of the photograph area in the multi-tone gradation and image data in the document area in the binary density or gradation; and wherein the background density of the image data of the photograph area is adjusted to a constant printing density and the image adjusted in its background density is printed out in the multi-tone gradation.

2. The method according to claim 1, wherein the position of the photograph area is preset in a memory.

3. The method according to claim 1, wherein only image data of the binary density area is processed in an edge-emphasizing processing.

4. A control method for a microfilm image reader, in which a scanner reads an image of a frame recorded on a microfilm and supplies image data of the read image to a printer, comprising the steps of:

reading the image in a multi-tone gradation by said scanner; and printing out image data of at least one portion of the read image in the multi-tone gradation by said printer; and wherein the image of the frame recorded on the microfilm contains both a halftone portion in a photograph area and a binary density portion in a document area, and said printer prints out image data of the photograph area in the multi-tone gradation and image data in the document area in the binary density or gradation; and wherein the background density of the image is adjusted to a constant printing density and the image adjusted in its background density is printed out in the multi-tone gradation.

* * * * *